United States Patent Office 2,704,968
Patented Mar. 29, 1955

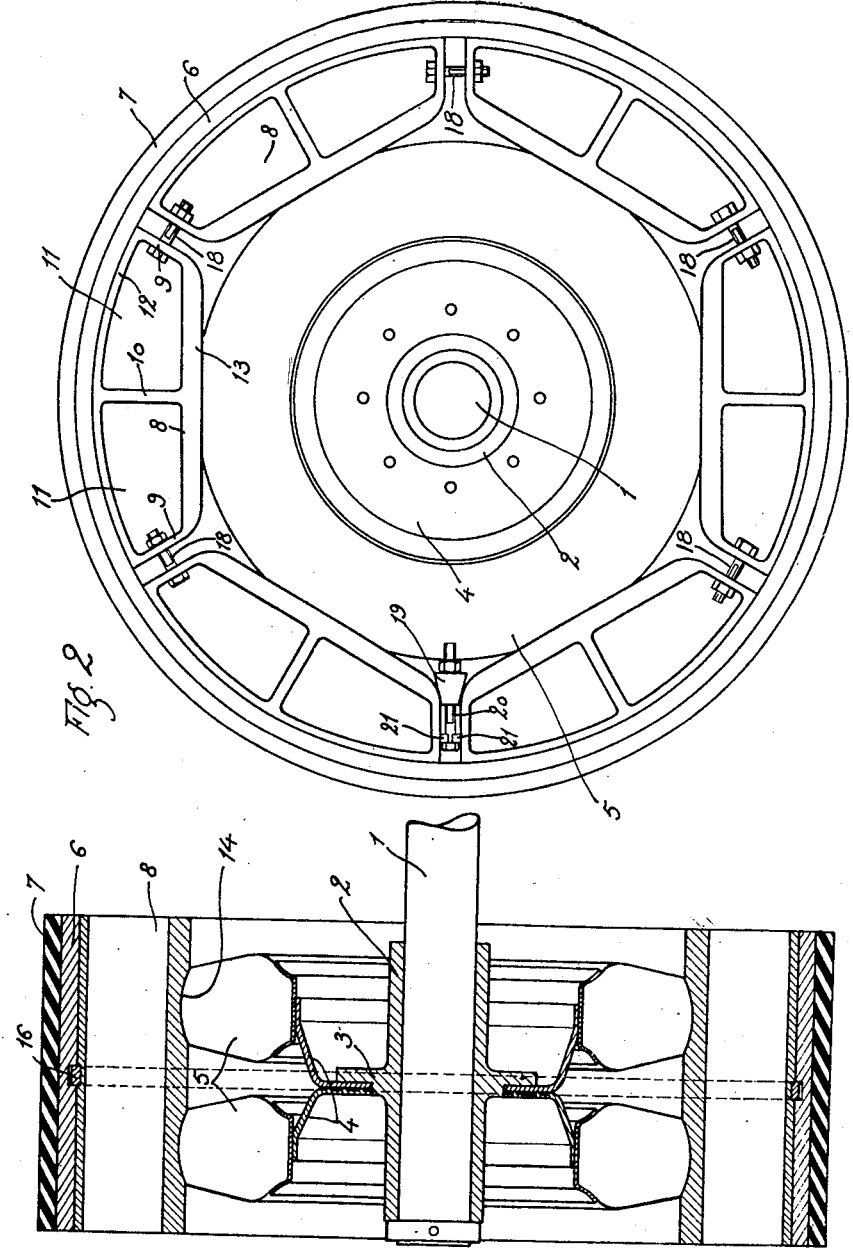

2,704,968
PNEUMATICALLY SUSPENDED ROAD ROLLER WHEEL

Jean M. Paramythioti, Rantigny, France, assignor to Société Anonyme des Anciens Etablissements Albaret, Rantigny, France, a corporation of France Application May 20, 1952, Serial No. 288,970

Claims priority, application France May 22, 1951

5 Claims. (Cl. 94—50)

In road rollers built up to the present the wheels intended for rolling operations are usually formed by a metallic rim which is bound to the hub by side-plates. The rim is either made up of moulded steel which comes from the foundry fitted with inner ribs and especially ringed ribs for side-plate fixation—or is made up of a thick steel-plate ferrule soldered to the side-plates, the bonding of the side-plates to the hub being generally effected by bolts.

In both cases the wheel forms a rigid whole which transmits fully to the appliance and its mechanism all the vibrations caused by the running of the wheel tire—usually formed by the metal tire itself—on the roughness of the metalling to be rolled. The replacement of a worn out tire is a costly operation.

The object of the present invention is a wheel with a metallic rim which can be taken apart, especially for a roller, and is made up of three concentric parts, a central part formed by a center wheel having pneumatic tires, an outer ring formed by a metallic rim with an internal cylindrical surface and an intermediary ring formed by pieces shaped as cylinder segments, applied on the whole width of the metal against the internal cylindrical surface of the rim by the inflation pressure of the pneumatic tire which engages in the similar shaped circumferentially aligned grooves of the segments.

In the case of a road-roller, the rim is formed by the already known steel plate ferrule but forming a distinct piece. The tire can be a metallic one and formed by the cylindrical outer surface of the ferrule. It can also be made of rubber vulcanized on the ferrule.

The segments are preferably hollow pieces open on the lateral surfaces of the wheel. They are connected ring-fashion by bolts which allow them to be brought together to lessen the outside diameter of the ring, and carry a spreading device which permits of expanding said intermediate ring against the inner cylindrical surface of the rim. They can also carry a keying device between said rim and said segments to keep the rim laterally centered on said segments.

Various advantages result from this construction and these will be made clear in the following description of an execution example of the wheel according to the invention intended for a road-roller. One will refer to the accompanying drawings, in which:

Figure 1 is an axial section view of a wheel according to the invention;

Figure 2 is a side view of the same wheel.

On axle 1 of the roller an elongated hub 2 is mounted which carries, fixed on a median flange 3, two twin metallic wheels 4 carrying pneumatic tires 5. This set forms the central part of the road-roller wheel.

The wheel rim is formed by a metallic ferrule 6, which in this case is covered by a vulcanized full rubber tire 7.

Ferrule 6 is fixed on the pneumatic tires by the insertion following a ring-like disposition of intermediary pieces in the shape of cylinder segments 8. Each segment is of a length which corresponds to the width of the rim and is made up of a hollow moulded piece open at both ends. Its small sides 9 are radial following a 60 deg. angle to the center of the wheel. Its width is divided by a radial rib 10 which partitions the segment into two symmetrical canals 11 and supports the arch formed by a cylindrical outside wall 12 which coincides with the inner wall of the ferrule on a thicker flat interior wall 13. On its internal face wall 13 is hollowed with depressions or grooves 14 having the cross-section of the peripheral portion of pneumatic tires 5, thus seating the segments on these tires in a well determined position in the lateral direction. Any suitable device can ensure the position of the ferrule on the segments in the lateral direction. It can consist of keys 16 which are tailed into the segments and of which the slight height projection engages with a small amount of play into a circular slot of the internal surface of the ferrule.

The segments are bound together by drawing bolts, 18, for example two of them between each pair of consecutive segments.

These bolts allow the bringing together of the segments two by two in order to lessen the outside diameter of their ring. For a contrary action one can provide between two consecutive segments a mechanical expansion device formed for instance by wedges 19 sliding radially on the shanks of bolts 20, the heads of which rest on outside face of opposite ears 21 bearing on small sides 9. Tightening of nuts of bolts 20 moves the wedges towards the outside by forcing the segments to spread out and permits to set them strongly against the internal surface of the ferrule.

The two distinct devices of restriction and expansion could be united into a single device. Each device would then be made up of a shank symmetrically threaded at opposing pitches, carrying a working-gear in the interval of the segments, the two threaded parts screwing into nuts tailed in with play in the extremities of the segments.

The wheel, the construction of which has just been described, allows an easy taking apart of the rim. One deflates the tires and tightens drawing bolts 18. The ring of segments contracts whilst compressing the pneumatic tires. A slight retraction is enough to disengage keys 16 of their groove. The freed rim can be removed by sliding on the ring of segments.

Inversely, to fit a rim on the wheel, one introduces it by sliding it onto the segments tightened against the deflated tires. When it is in place, bolts 18 are loosened and wedge screws are tightened until the ring of segments is strongly fitted against the internal surface of the ferrule, keys 16 engaging in its slot, the tires then being inflated until their outer surface fits strongly against the segments. During the running of the wheel the segments being mechanically integral with the ferrule do not risk displacement by sagging of the tires.

The ease of taking down the rim allows not only to foresee the replacement of a worn-out rim, but also to change the nature of the rolling band according to the rolling work one needs effect.

Generally one uses a metallic rolling band which is suitable for the consolidation of road metalling. However, metallic bandages are not suitable for small gravel rolling, this being spread in a thin layer on a consolidated metalling when preparing bituminous revetments. The small gravel which happens to get caught between the hard surface of the roller and an element of the metalling gets crushed and the granulous measure of the small gravel is thus changed, whereas the good cohesion of the revetment requires it to have a well determined value. The construction which has just been described allows for this work the adaptation on the wheel of a rim with rubber revetment as in the example set forth.

There is here an important advantage of the wheel according to the invention. It is indeed known that, in wheels carrying a full rubber tire the metallic rim on which the rubber is vulcanized, is fitted by hooping on the actual wheel of the vehicle. This method of fitting is practically excluded by the important dimensions of road-roller wheel.

Therefore it has already been proposed for the rolling of small gravel to utilize special road-rollers the wheels of which have as a rolling band a series of juxtaposed pneumatic tires. These wheels do not allow to obtain as good a rolling as the broad-tired wheels due to the fact of the discontinuity of pressure in the sense of the road width, which is a result of the gaps between the relatively narrow rolling bands of the tires.

The device according to the invention, which permits for small gravel rolling to substitute the metallic tire of a road-roller wheel by a full rubber tire of same width, not by hooping but by expansion of the central part of the wheel, brings therefore a practical solution to the adaptation of the roller to the work which is required of it.

This solution is economical as it allows the use of the same material for several objects. It secures therefore a better coefficient of utilization and pay-off for this costly material.

Furthermore, the fitting described presents other substantial advantages.

Indeed it secures a flexible suspension which absorbs the vibrations caused by the unevenness of the road and by this fact spares the assemblage, thus allowing greater change-of-place speeds on roads between workings. The flexibility of the pneumatic tires, lying between the wheel and the tire, acts also in the transmission of the rotary movement and considerably reduces the wear of the mechanism connecting to the engine. Finally it intervenes even in the stability as it makes a light rim elevation possible on its axis by the unequal deflection of the two pneumatic tires, which enables the tires of the two back wheels of a roller to fit correctly on the road despite the transversal bulge of the road.

In the wheel described the rim is furthermore much better supported than in the usual road-rollers, even those mounted with moulded-steel rims. Indeed it obtains support on its whole internal surface against the ring of segments, which removes any risk of deformation or breakage. Its utilization can be continued much longer despite wear. Finally, the segment construction allows the weight of the wheel to be adapted to each particular work, as its ballasting can be obtained by blocks inserted in the segment canals and clamped or held by any suitable means.

Although in the example described, the central part of the wheel comprises twin tires, one can very well foresee a single tire, this disposition having beside the advantage of increasing the flexibility in the lateral sense.

It is quite obvious that the construction of wheels according to the invention is suitable for applications other than road-rollers, especially for railroad wheels. The invention extends to any wheel presenting the described characteristics, whatever its destination.

What I claim is:
1. A pneumatically suspended road roller wheel comprising in combination, a center wheel having pneumatic tires, an outer ring formed by a metallic rim having an internal cylindrical surface, an intermediary ring formed by a plurality of spaced segments disposed transversely of the rim intermediate said rim and pneumatic tires, each of said segments having an outer cylindrical surface conforming in curvature to the inner surface of said rim and a planar inner surface provided with circumferentially aligned grooves to receive and seat the pneumatic tires of the center wheel, and adjustable bolts tying said segments together, whereby they can be brought together upon deflation of the tires to free the rim for removal.

2. A road-roller according to claim 1, in which said metallic rim has a rubber tire vulcanized thereon.

3. A road-roller according to claim 1, in which said segments are hollow pieces open on the lateral surfaces of the wheel.

4. A road-roller according to claim 1, comprising further a keying device between said outer ring and said segments on the middle line of the outer cylindrical surface of said segments whereby said rim is kept centered on said segments.

5. A road-roller according to claim 1, comprising further opposed ears on the contiguous surfaces of certain of said segments, a bolt received therebetween, and a wedge-shaped spreader on the outer end of the bolt adapted to spread said contiguous segments when driven therebetween to expand said intermediary ring against the inner cylindrical surface of said metallic rim.

References Cited in the file of this patent

UNITED STATES PATENTS

| | | |
|---|---|---|
| 1,151,436 | Bamford | Aug. 24, 1915 |
| 1,673,816 | Emerson | June 19, 1928 |
| 1,935,950 | Lawrence | Nov. 21, 1933 |

FOREIGN PATENTS

| | | |
|---|---|---|
| 421,675 | Great Britain | Dec. 28, 1934 |